United States Patent

[11] 3,610,834

[72] Inventors Klaus Gueldenpfennig; Frank Churnetski; Enrique Comas, all of Monroe County, N.Y.

[21] Appl. No. 773,071
[22] Filed Nov. 4, 1968
[45] Patented Oct. 5, 1971
[73] Assignee Stromberg-Carlson Corporation

[54] LOW-LEVEL DUPLEX SIGNALLING SYSTEM FOR TELEPHONE NETWORKS
10 Claims, 1 Drawing Fig.

[52] U.S. Cl. .................................................. 179/43, 179/16 A
[51] Int. Cl. .................................................. H04m 7/10
[50] Field of Search .................................................. 179/16.09, 43, 2 DP, 16 A, 58; 178/58, 23

[56] References Cited

UNITED STATES PATENTS

| | | | |
|---|---|---|---|
| 2,310,279 | 2/1943 | Dahlbom et al. | 178/58 |
| 2,396,798 | 3/1946 | MacPherson | 179/43 |
| 2,829,205 | 4/1958 | Elliott | 179/43 |
| 3,226,480 | 12/1965 | Wright et al. | 179/2 DP |

*Primary Examiner*—Kathleen H. Claffy
*Assistant Examiner*—Randall P. Myers
*Attorney*—Charles C. Krawczyk

ABSTRACT: A duplex signalling system for transmitting direct-current (DC) signals over a conductive transmission path is described. A separate switching circuit is connected to a balanced connection at each end of the path to receive and transmit the direct-current (DC) signals, such as dialing pulses. The transmitter portion of the switching circuit at one end normally applies a first low-level DC signal (such as 5 volts) to the path and is switched between the first low-level signal and a second low-level signal (such as ground) when transmitting signals. The transmitter portion of the switching circuit at the other end only applies the second low-level signal to the path when transmitting signals. The receiver portion of the switching circuit at each end of the path is responsive to the second low-level signal from the transmitter circuit at the opposite end of the path to produce an output signal, and is inhibited when the transmitter at the same end applies the second level of signal to the path.

PATENTED OCT 5 1971 3,610,834
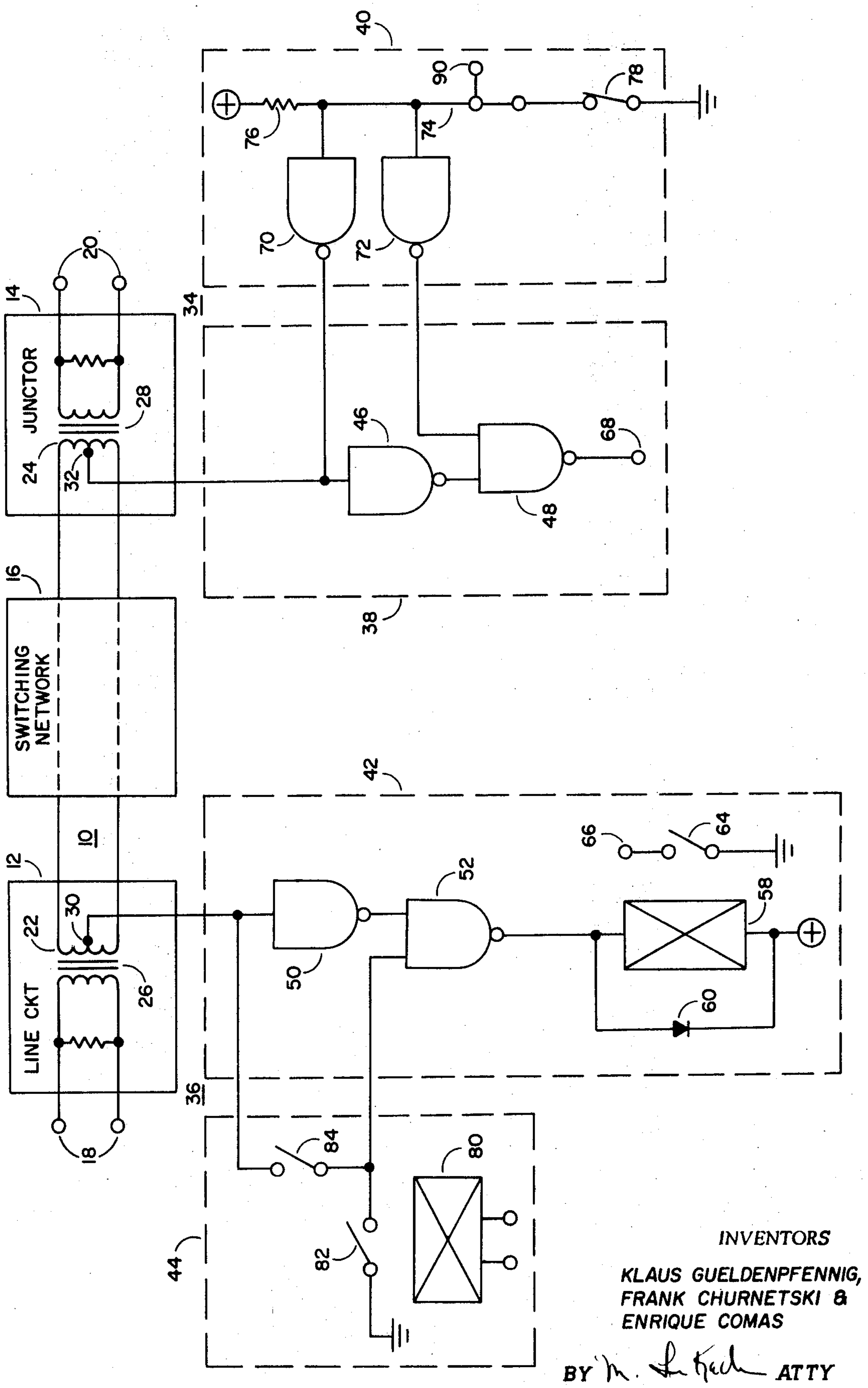
INVENTORS
KLAUS GUELDENPFENNIG,
FRANK CHURNETSKI &
ENRIQUE COMAS
BY M. [signature] ATTY

LOW-LEVEL DUPLEX SIGNALLING SYSTEM FOR TELEPHONE NETWORKS

The present invention relates to telephone systems and particularly to a system for transmitting voice signals and supervisory signals over the same transmission path.

The invention is especially suitable for use in telephone systems having automatic switching systems for establishing a transmission path for voice or other intelligence signals and permit the use of the same path for the transmission of supervisory signals, control signals and the like.

The use of the voice transmission path for carrying DC supervisory control signals ordinarily introduces distortion and interference with the voice signals which are transmitted over the path. Noise spikes and other transient effects which are picked up by any parallel transmission path crosstalk may also interfere with the operation of the supervisory signal reception system, such that a noise impulse may erroneously by mistaken for a supervisory signal. Interference and distortion of voice signals is particularly pronounced when electromagnetic switching circuits, such as relays, are used in the supervisory signalling system. Such relay circuits require high DC operating levels and produce switching transients which are readily detected by the voice signal responsive circuits which are also connected to the transmission path. The switching transients and the loading of the path with direct current of high amplitude is detected by the voice signal responsive units as distortion which may not be tolerable.

Accordingly, it is an object of the present invention to provide an improved telephone signalling system whereby supervisory and control signals may be carried over the same transmission path as voice or other audio signals.

It is another object of the present invention to provide an improved signal for bidirectional (duplex) signalling over a voice transmission path which is operative at low signalling levels so as to reduce interference with the voice path as well as voice distortion by the signals which are transmitted over the same o r a parallel path.

It is still another object of the present invention to provide an improved duplex signalling system which shares the voice transmission path with voice or other audiofrequency signals which are transmitted over the path, which is operative at low signalling levels so as to reduce emanation of the signals so as to lend itself to secure communications as may be required in a military telephone system.

It is a further object of the present invention to provide an improved duplex signalling system operative over voice transmission paths which is relatively insensitive to noise impulses which would otherwise introduce erroneous signals.

Briefly described, a duplex signalling system embodying the invention includes logic circuits at each end of a transmission path which may be a two-wire or four-wire path established from a line circuit at one end of the path and to a junctor at the other end of the path through an electronic switching network. Logic networks are provided both at the junctor and the line circuit ends of the transmission path. Each logic network contains gates interconnected to provide an output indicating the reception of a supervisory or other control signal when the level of the DC voltage applied thereto changes from a first level, say positive, to a second level, say ground. The logic network at each end of the path, normally apply a said first level to the path in an idle position. Thus, noise impulses which my appear on the transmission path introduced from a parallel path are ineffective in producing an error as the pulse would have to go to level ground to be detected as a supervisory or control signal. The logic networks include circuits which transmit a supervisory or control signal by changing the voltage level applied to the path. These circuits are operative to inhibit the reception network associated therewith, during the transmission whereby to provide duplex signalling operation. The employment of a balanced transformer with a center tap as termination attenuates the noise generation in the audio network.

The invention itself, both as to its organization and method of operation, as well as additional objects and advantages thereof will become more readily apparent from a reading of the following description in connection with the accompanying drawing in which the sole figure is a schematic diagram, partially in block form showing a duplex signalling system for supervisory and control signals in accordance with an embodiment of the present invention.

The drawing illustrates a completed two-wire transmission path 10 which is extended from a line circuit 12 to a junctor 14 through a switching network 16. Both ends of the path may be terminated in 600 ohm loads which are provided by the telephone lines or telephone station sets which may be connected across the line circuit terminal 18 and the junctor terminals 20. The transmission path 10 is terminated by windings 22 and 24 of coupling transformers 26 and 28 in the line circuit 12 and junctor 14, respectively. Each of these terminating windings 22 and 24 has a balanced point 30 and 32. It is desirable that the transformers 26 and 28 have good balance, inasmuch as direct current signals flowing through each of the wires of the path will then be in balanced relation so as to reduce interference with and distortion of the voice signals which are transmitted over the path 10. Due to the low-level signalling with respect to current and voltage which is accomplished in accordance with a feature of the invention, the transformers may be small audio transformers. The output terminals 20 of the junctor coupling transformer 28 may be connected to the junctor hybrid and therefrom to the switching system which connects the junctor to other trunks or to telephone station sets.

The signalling system includes stations 34 and 36 at the junctor and line circuit ends of the path 10 which are connected respectively to the balance points 32 and 30. The junctor station 34 includes a receiving logic network 38 and a transmitting logic network 40. Similarly, the line circuit 36 includes a receiving logic network 42 and a transmitting logic network 44. Both receiving logic networks are similar and include a pair of logic gates which are operative at low level, say under 5 volts DC specifically, the network 38 includes a first inverter 46, which may be a NAND gate connected in an inverter configuration, and a second NAND gate 48 which receives an input from the output of the inverter 46 and also from the transmit network 40. The receive logic network 42 includes a pair of gates 50 and 52 which are connected similarly to the gates 46 and 48.

An input level (logical "0"), say ground, which may be applied to an input of an inverter, is translated to a +5 volt DC level (logical "1") at the output of the gate. When a pair of positive input levels are each applied to a different input of a gate, the output thereof is a ground level. A ground level applied to one input of the gate necessarily results in a positive level of about 5 volts at the output thereof.

A relay 58 and diode 60 are connected to the output of the gate 52 in the receiving logic network 42. The output of gate 48 can be used to drive a relay in the same manner as described for gate 52 or can direct feed into further logic for a signal processing. Thus, when the output of the gate 48 or 52 goes to ground potential in response to the reception of a supervisory or control signal, its associated relay 58 or appropriate logic circuit pulls in closing contact 64, in case of the relay 58. External circuits in the line circuit 12 may be connected to a terminal 66. External circuits or circuits in the junctor 14 may be connected to an output terminal 68. Accordingly, when the relay 58 pulls in, ground is extended to the external circuits which are connected to the terminal 66 and ground is similarly extended when the NAND gate 48 is operated.

The transmitting network 40 at the junctor end of the path 10 includes a pair of NAND gates 70 and 72 which are connected in inverter configuration. A signalling circuit 74 which is connected to the input of these gates 70 and 72 includes a source of low-level voltage, say about 5 volts positive, which is applied via a resistor 76 to ground via a signalling device, such as the contacts 78 of a dial or relay (not shown). The contacts 78 are normally closed, thereby applying "0" levels at the inputs to the inverter gates 70 and 72. These gates therefore provide positive "1" levels at the outputs thereof. The positive level at the output of the gate 70 applies a positive voltage to he path 10. The inputs of the gates 46 and 50 in the receiving logic networks 38 and 42 also have the positive voltage level applied thereto; the gate 50 receiving this voltage via the path 10. This positive level is translated to a positive level at the output of the gates 48 and 52, thereby rendering the relay 58 inoperative.

Accordingly, even if noise spikes may appear on the line, they will not switch the gates 48 and 52 and therefore do not produce erroneous outputs.

The positive output level normally provided by the gate 72 (the contacts 78 being closed in nonsignalling condition) also enables the gate 48 to switch its output from positive level to ground when a supervisory signal is applied to the receive logic network 38. When the contact 78 opens, however, a ground level is applied to the input of the gate 48 which is connected to the output of the inverter gate 72, thereby inhibiting the gate 48 at the time when a supervisory pulse is transmitted.

The supervisory pulse is transmitted since the gate 70 switches during the period that the contact 78 is open and extends ground over the transmission path 10 to the input of the gate 50 at the receiving unit 42. The output of the gate 52 then goes to ground, causing the relay 58 to pull in, thereby responding to the supervisory signal by closure of its contacts 64.

The transmitting logic 44 of the station 36 includes a relay 80 having a pair of contacts 82 and 84 which re normally opened but are pulled in when the relay 80 is operated by external circuits when a supervisory pulse is to be transmitted to the junctor station 34. Alternatively, a logic network similar to the network 40 may be used. The application of ground to an input of the gate 52 in the receiving network 42 inhibits that gate 52 from switching to a ground output level. Thus, the relay 58 is not operated when a supervisory signal is transmitted from the line circuit station 36. The relay contact 84 is normally open, thereby maintaining the input terminal to the gate 52 in open circuit condition during periods when the transmitting logic 44 is inoperative. The gate 52 then functions as an inverter.

Ground is extended to the transmission path 10 when the contacts 82 and 84 pull in. This ground level is detected at the input of the gate 46 in the receiving logic 38 at the junctor end of the path 10 and provides a ground at the output of gate 48.

All of the gates 46, 48, 70 and 72 in the station 34 at the junctor end of the path 10 may be embodied in a single integrated circuit element. Similarly, the gates 50 and 52 in the station 36 at the line circuit end may be contained in a single integrated circuit. Thus, the supervisory signalling system may be exceeding small in size and readily associated with the circuitry normally disposed at the line circuit and junctor ends of the switching network.

A terminal 90 may be connected to the signalling circuit 74 in the transmitting logic network 40. This terminal may be connected to a balance point on another transmission path similar to the transmission path 10. In that event, the switching contact 78 is maintained in open position so that ground may be extended to the terminal 90 and via the system which therefore acts as a repeater.

From the foregoing description, it will be apparent that there has been provided an improved telephone system having supervisory and control signal transmitting capabilities over the same transmission path as is used to carry voice frequency signals. While an illustrative embodiment of the invention has been described, it will be appreciated that the showing and description has been simplified in order to more clearly elucidate the invention. Variations and modifications in the herein described system, within the scope of the invention, will undoubtedly suggest themselves to those skilled in the art. For example, the invention may be applied to any voice transmission line which is two or four wire terminated with transformers for simplex, duplex or phantom operation. Accordingly, the foregoing description should be taken merely as illustrative and not in any limiting sense.

We claim:

1. In a telephone system having a conductive transmission path, a duplex signalling system comprising:
   a. signal transmitting means at one end of said path for applying a first level of DC signal to said path when idle, and for signalling by applying a second level of DC signal having a level of magnitude different than said first level of DC signal to said path,
   b. signal receiving means at opposite end of said path, each including first and second gating circuits with the input of the first gating circuit connected to said path and the output of said first gating circuit connected to the input of said second gating circuit so that said second gating circuit produces an output signal in response to said first gating circuit receiving said second level of DC signal,
   c. signal transmitting means at the other end of said path for applying said second level of signal to said path,
   d. means in said signal transmitting means at said one end of said path for applying a signal to an input of said second gating circuit to inhibit the receiving means located at said one end of said path when said last-named transmitting means applies said second level of signal to said path,
   e. means in said transmitting means at said other end of said path for applying a signal to an input of said second gating circuit to inhibit said receiving means at said other end of said path when said last-named transmitting means applies said second level of signal to said path, and
   f. switching circuit means connected to an output of at least one of said second gating circuits for actuation said output signal.

2. The invention as set forth in claim 1 wherein said first and second gating circuits are contained in the same integrated circuit element.

3. In a telephone system having a conductive transmission path, a duplex signalling system comprising:
   a. signal transmitting means at one end of said path for applying a first level of DC signal to said path when idle, and for signalling by applying a second level of DC signal having a level of magnitude different than said first level of DC signal to said path, wherein said signal transmitting means at said one end of said path includes first and second gating circuits, and a signalling circuit connected to the input of said first and second gating circuits for applying switching signals thereto to switch the output of each of said gating circuits between said first and second levels of signal, and means for connecting the output of said first gating circuit to said path for applying said first and second levels of signal to said path,
   b. signal receiving means at opposite ends of said path operative upon receipt of said second level of DC signal to provide an output,
   c. means in said transmitting means at said one end of said path for connecting the output of said second gating circuit to said receiving means at said one end of said path for inhibiting said receiving means when said last-named transmitting means applies said second level of signal to said path,
   d. signal transmitting means at the other end of said path for applying said second level of signal to said path, and
   e. means in said transmitting means at said other end of said path for inhibiting said receiving means at said other end of said path when said last-named transmitting means applies said second level of signal to said path.

4. The invention as set forth in claim 3 wherein said first gating circuit and said second gating circuit are NAND gates and wherein said signalling circuit includes means for connecting a source of potential having one level to the inputs of said gating circuits, and a normally closed contact connected between another source of potential having a different level and the inputs of said gating circuits.

5. The invention as set forth in claim 4 wherein said signal receiving means at said one end of said line includes third and fourth gating circuits, and wherein said first, second, third and fourth gating circuits in said transmitting means and in said signal receiving means are all contained in the same integrated circuit element.

6. The invention as set forth in claim 3 wherein said telephone system includes a line circuit and a junctor, and wherein said one end of said path is disposed at the junctor and said other end of said path is disposed at said line circuit.

7. The invention as set forth in claim 6 wherein said receiving means at said line circuit end of said path includes a pair of gating circuits connected in tandem, the first of said gating circuits being connected to said path and the second of said gating circuits being connected to the output of the first of said gating circuits so that said second gating circuit is inhibited when said first level of signal is applied to said first gating circuit and is enabled when said second level of signal is applied to said first gating circuit, and wherein said transmitting means at said line circuit end of said line includes means for applying said second level of signal to said path for transmitting a signal to said receiving means at the junctor end of said line, said means being operative to simultaneously apply said second level signal to said second, gating circuit for inhibiting said second gating circuit.

8. The invention as set forth in claim 3, wherein said transmission path is a two wire connection, a winding disposed at each of the opposite ends of said connection for terminating said path, said winding having a balanced point, a pair of stations at said opposite ends of said line each including said receiving means and said transmitting means, and means connecting said stations to said balanced point at their respective ends of said path.

9. The invention as set forth in claim 8 wherein said winding is a winding of a transformer having another winding for applying voice frequency signals to said path and deriving voice frequency signals therefrom.

10. A duplex signalling system for transmitting DC signals over a conductive transmission path comprising:

a first gating circuit coupled to a first end of said path for applying DC signals thereto;

first switching circuit means coupled to said first gating circuit so that said first gating circuit applies a first level of DC signal to said path when idle, and for signalling by switching said first gating circuit to apply a second level of DC signal having a magnitude different than said first level of signal to said path;

second and third gating circuits wherein the input of the second gating circuit is coupled to the first end of said path and the output of said second gating circuit is connected to the input of said third gating circuit so that said third gating circuit produces an output signal when said second gating circuit receives said second level of signal;

second switching circuit means coupled to a second end of said path for signalling by applying the second level of signal to said path;

fourth and fifth gating circuits wherein the input of the fourth gating circuit is coupled to said fourth gating circuit is connected to the input of said fifth gating circuit so that said fifth gating circuit produces an output signal when said fourth gating circuit receives said second level of signal;

circuit means coupling said first gating circuit to said third gating circuit for inhibiting said applies said second level of signal to said path, and circuit means coupling said second switching circuit means to said fifth gating circuit for inhibiting said fifth gating circuit when said second switching means applies said second level of signal to path.